United States Patent
Hou et al.

(10) Patent No.: US 10,744,512 B2
(45) Date of Patent: Aug. 18, 2020

(54) RAW MATERIAL PRE-TREATMENT METHOD AND RAW MATERIAL PRE-TREATMENT PROCESS SYSTEM SUITABLE FOR KILN PHOSPHORIC ACID PROCESS

(71) Applicant: SICHUAN KO CHANG TECHNOLOGY CO., LTD, Chengdu (CN)

(72) Inventors: Yonghe Hou, Chengdu (CN); Jun Wu, Chengdu (CN); Shihua Liu, Chengdu (CN)

(73) Assignee: SICHUAN KO CHANG TECHNOLOGY CO., LTD., Chengdu (CN)

( * ) Notice: Subject to any disclaimer, the term of this patent is extended or adjusted under 35 U.S.C. 154(b) by 1263 days.

(21) Appl. No.: 14/958,899

(22) Filed: Dec. 3, 2015

(65) Prior Publication Data

US 2016/0083255 A1  Mar. 24, 2016

Related U.S. Application Data

(63) Continuation-in-part of application No. PCT/CN2013/081232, filed on Aug. 9, 2013.

(30) Foreign Application Priority Data

Jun. 4, 2013  (CN) .......................... 2013 1 0218626

(51) Int. Cl.
  *B02C 23/38* (2006.01)
  *C01B 25/20* (2006.01)
  (Continued)

(52) U.S. Cl.
  CPC .............. *B02C 23/38* (2013.01); *B02C 21/00* (2013.01); *B02C 23/08* (2013.01); *B02C 23/18* (2013.01); *C01B 25/185* (2013.01); *C01B 25/20* (2013.01)

(58) Field of Classification Search
  CPC ......... B02C 23/08; B02C 23/18; B02C 23/38; B02C 21/00; C01B 25/02; C01B 25/12; C01B 25/20; C01B 25/185; C01B 25/18
  (Continued)

(56) References Cited

U.S. PATENT DOCUMENTS 3,078,048 A * 2/1963 Russell .................. B02C 17/00
                                                          241/17
5,298,475 A * 3/1994 Shibata .................. B01D 53/62
                                                         423/230

(Continued)

FOREIGN PATENT DOCUMENTS

| CN | 1096273 A | 12/1994 |
| CN | 1562847 A | 1/2005 |
| CN | 1837129 A | 9/2006 |
| CN | 101531351 A | 9/2009 |
| CN | 101613800 A | 12/2009 |
| CN | 102126712 A | 7/2011 |

OTHER PUBLICATIONS

International Search Report in international application number: PCT/CN2013/081232, dated Mar. 6, 2014.
(Continued)

*Primary Examiner* — Teresa M Ekiert
*Assistant Examiner* — Sarkis A Aktavoukian

(57) ABSTRACT

Disclosed is a raw material pre-treatment process system suitable for a kiln phosphoric acid process, comprising a carbonaceous reductant, a phosphate ore and a silica pre-treatment system which are independent from one another, outlets of the carbonaceous reductant, phosphate ore pre-treatment system and silica pre-treatment system are all connected to an inner pellet material mixing device via a first
(Continued)

delivery device, and outlets of the carbonaceous reductant and the silica pre-treatment system are both additionally connected to a shell material mixing device via a second delivery device. Also disclosed is a raw material pre-treatment process suitable for a kiln phosphoric acid process, i.e. pre-treating carbonaceous reductant, phosphate ore and silica respectively, feeding the carbonaceous reductant powder, phosphate ore powder and silica powder into the inner ball material mixing device for pelletizing, and feeding the carbonaceous reductant and silica into the shell material mixing device for mixing.

4 Claims, 1 Drawing Sheet

(51) Int. Cl.
  B02C 21/00     (2006.01)
  B02C 23/08     (2006.01)
  B02C 23/18     (2006.01)
  C01B 25/18     (2006.01)
(58) Field of Classification Search
  USPC .................................. 423/141; 241/152.2
  See application file for complete search history.

(56) References Cited

U.S. PATENT DOCUMENTS 5,338,337 A * 8/1994 Johnson .................... B03B 9/00
                                                  209/164
2004/0109809 A1* 6/2004 Hokanson ............... C01B 25/12
                                                  423/318
2008/0015104 A1* 1/2008 Janik ................... B02C 17/1845
                                                  501/128

OTHER PUBLICATIONS

English Translation of the Written Opinion of the International Search Authority in international application No. PCT/CN2013/081232, dated Mar. 6, 2014.
Hou, Yonghe et al., New process of CDK kiln-method phosphoric acid and industrialization foreground thereof, Sulfur & Phosphorus Design, 1997, No. 2, pp. 6-8, ISSN: 1009-1904.
Xue, Shenghui et al., A new process for producing commercial phosphoric acid-new process for preparing phosphoric acid by CDK method, Inorganic Chemicals Industry, 1995, No. 5, pp. 23-27, ISSN: 1006-4990.

* cited by examiner

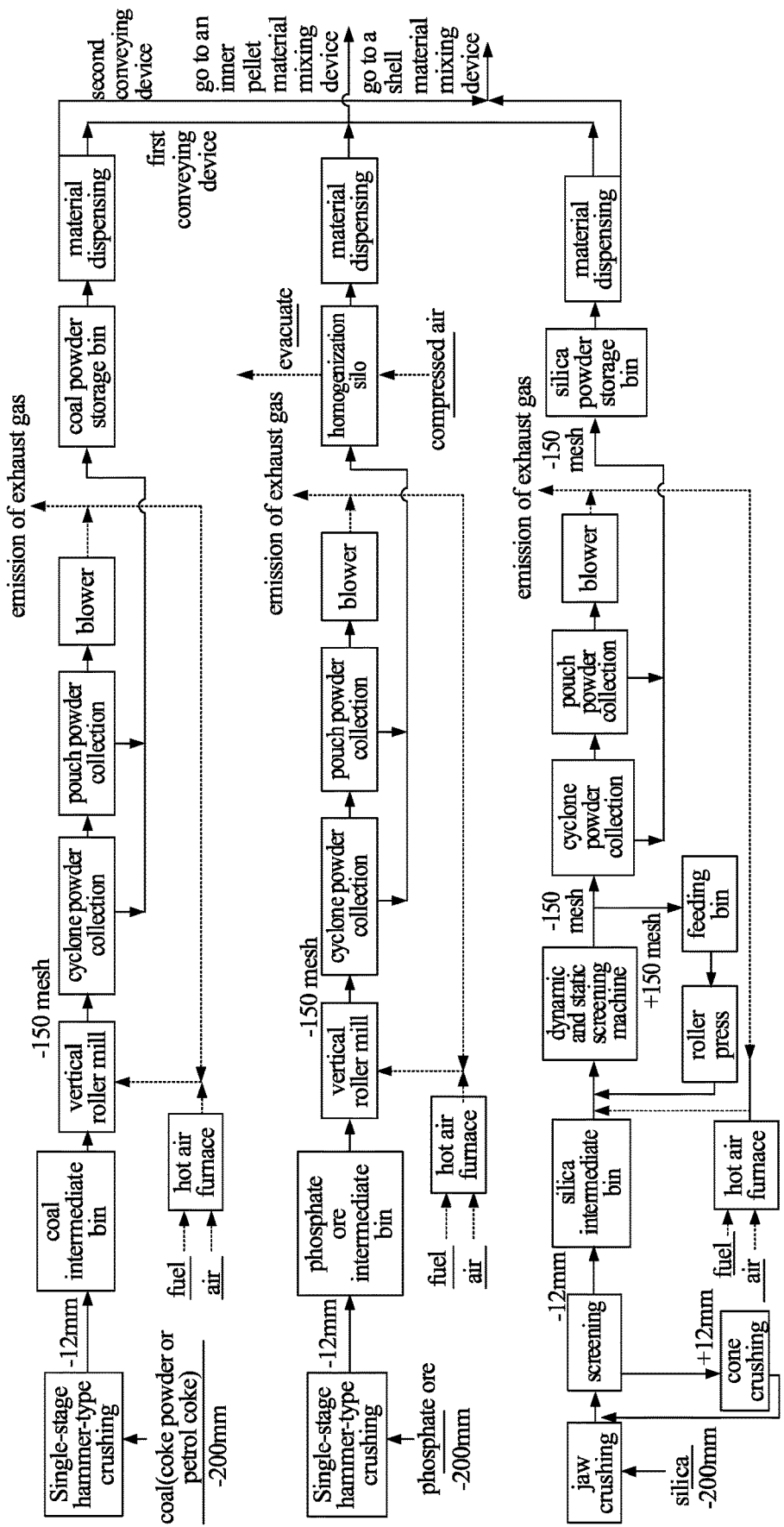

RAW MATERIAL PRE-TREATMENT METHOD AND RAW MATERIAL PRE-TREATMENT PROCESS SYSTEM SUITABLE FOR KILN PHOSPHORIC ACID PROCESS

CROSS-REFERENCE TO RELATED APPLICATION

The application is a continuation in part of PCT/CN2013/081232 (filed on Aug. 9, 2013), which claims priority of CN Patent Application Serial No. 201310218626.5 (filed on Jun. 4, 2013) the contents of which are incorporated herein by reference in their entirety.

FIELD OF THE INVENTION

The present invention is related to raw material pre-treatment method and device for process for production of phosphoric acid, and more particularly to a raw material pre-treatment method and a raw material pre-treatment process system for kiln phosphoric acid process (KPA).

BACKGROUND

At present, there are chiefly two processes for producing phosphoric acid in industry. (1) producing phosphoric acid with a wet process: using sulfuric acid to decompose phosphate ore to obtain dilute phosphoric acid and solid slag (briefly called phosphogypsum) with $CaSO_4.nH_2O$ as a main component, and concentrating the dilute phosphoric acid to obtain wet-process phosphoric acid with about 54% phosphoric acid. This process has the following major drawbacks: the first drawback is large consumption of sulfuric acid; the second drawback is that the slag phosphogypsum cannot be used effectively, and sulfuric acid, phosphoric acid and soluble fluorides entrained therein are all soluble in water, and rain wash of the slag piled in the nature is apt to cause serious pollution to the environment; the third drawback is that the resultant phosphoric acid contains higher contain of impurities and is generally only used to produce fertilizer; and the fourth drawback is that high-grade phosphate ore must be used to ensure economy of the product. (2) producing phosphoric acid with a hot process: first, placing phosphate ore, silica and carbonaceous solid reductant in an ore-smelting electric furnace, raising a temperature in the furnace to 1300° C. with energy of electric arc formed by electrical short-circuiting, reducing phosphor in the phosphate ore in the form of $P_4$, meanwhile converting carbonaceous solid reductant into CO, washing gas mainly containing $P_4$ and CO discharged out of the ore-smelting electric furnace with water, cooling $P_4$ into solid to separate from gas phase to obtain the product yellow phosphorus, igniting and burning exhaust gas containing CO at an outlet of a chimney and exhausting to the atmosphere; heating the obtained $P_4$ to 80° C. to change it into liquid phase, subjecting it to oxidization combustion reaction with introduced air in a hydration tower to obtain phosphoric anhydride $P_2O_5$, and then absorbing it with water to obtain phosphoric acid. The hot-process production of phosphoric acid has the following main drawbacks: the first drawback is large consumption of electrical energy; the second drawback is that gas discharged out of the ore-smelting electric furnace, from which $P_4$ is already separated, still entrains a large amount of fluorides (existing in the form of $SiF_4$ and HF) and a small amount of un-deposited gas $P_4$, which causes serious pollution to the atmospheric environment; the third drawback is that gas containing a large amount of CO is directly burnt and exhausted, which causes large waste of energy; the fourth drawback is that high-grade phosphate ore needs to be used to ensure economy of the production.

To overcome impact on production of phosphoric acid exerted by shortage of electrical energy, insufficient pyrites resources and gradual reduction of high-grade phosphate core, Occidental Research Corporation of the United States proposed a KPA process in 1980's, i.e., a process of producing phosphoric acid with a rotary kiln (briefly called a phosphoric acid producing process with a kiln) (see Frederic Ledar and Won C. Park, et al., New Process for Technical-Grade Phosphoric Acid, Ind. Eng. Chem. Process Des. Dev 1985, 24, 688-697), and carried out a pilot experiment of a pilot device in a 0.84 m (inner)×9.14 m (see the US patent document U.S. Pat. No. 4,389,384). According to this process, phosphate ore, silica and carbonaceous reductant (coke powder or coal powder) are co-ground so that 50%-85% of the co-ground materials passes a −325 mesh, with 1% bentonite being added to produce balls, which are dried and preheated by a chain-type dryer and then delivered into a rotary kiln with a kiln head in which natural gas is burnt, pellets are reduced in the kiln, a maximum solid temperature is controlled as 1400° C.-1500° C., pellet $CaO/SiO_2$ mole ratio is adjusted as 0.26-0.55 so that the a melting point of the pellet is higher than a carbon thermal reduction temperature of the phosphate core in the pellets, phosphor is reduced and volatiles out of the pellets in the form of phosphoric vapor, and then oxidized by air introduced in a middle space of the kiln into phosphorous pentoxide, heat resulting from oxidization is then supplied to the reduction reaction, and finally kiln gas containing phosphorous pentoxide is hydrated and absorbed to obtain phosphoric acid. The idea of the above processing phosphoric acid with a kiln exhibits an excellent industrial application prospect because its principle is to form $P_4$ gas using carbon thermal reduction of the phosphate ore, transfer phosphorus in the phosphate ore to gas phase of the rotary kiln, use a gas-solid separation principle to enable phosphorus to be well separated from other solid substances in the balls, allow the $P_4$ gas transferred into the gas phase of the rotary kiln to go through an oxidization heat liberation reaction with oxygen in the gas phase of the rotary kiln to generate $P_2O_5$, supply the liberated heat to carbon thermal reduction (endothermic reaction) of the phosphate ore in the material balls, and finally hydrate and absorb the kiln gas containing $P_2O_5$ exiting the rotary kiln to obtain industrial phosphoric acid having a cleanliness much higher than the phosphoric acid produced with the wet process. Since the rotary kiln uses primary energy to maintain phosphate ore carbon terminal reduction temperature, and meanwhile flammable substance $P_4$ generated from the phosphate ore carbon terminal reduction and CO are subjected to the combustion heat liberation reaction in the interior of the rotary kiln to replenish the energy needed to maintain the phosphate ore carbon terminal reduction temperature in the rotary kiln, this process substantially reduces energy consumption as compared with the conventional hot process of producing phosphoric acid.

However, the research indicates that it is very difficult to implement the process of producing phosphoric acid with the kiln in large-scale industrial application and practice and its main drawbacks are as follows:

1. A rotary kiln is an apparatus with a kiln body rotating at a certain speed (0.5 r/min-3 r/min), and it is advantageous in continuously performing mechanical turn and mixture of a solid material fed into the kiln to ensure uniformity of heat reception of the solid material at all locations in the kiln.

However, the solid material in the kiln must bear a mechanical frictional force resulting from movement of the material. If a strength of the material is smaller than the received mechanical frictional force, the material can be easily destroyed. A basic principle of the KPA process proposed by ORC corporation of the United States is to co-grind the phosphate ore, the silica and the carbonaceous reductant (coke powder or coal powder) so that 50%-80% of the co-ground materials passes 325 mesh, and then produce them into pellets, the three kinds of substances must be closely copolymerized into a whole so that the mixture does not melt at the carbon thermal reduction temperature of the phosphate ore under the condition the $CaO/SiO_2$ mole ratio in the mixture is 0.26-0.55, and meanwhile carbon reduction of the phosphate ore can be performed smoothly. However, since the reductant carbon is added to the material pellets used in the process, carbon goes through quick oxidization reaction with oxygen in air at a temperature greater than 350° C. to produce $CO_2$. If a conventional method of consolidating pellets at a high temperature (≥900° C.) at a chain grate in the metallurgical industry is employed, the reducing carbon in the pellets will be all oxidized, the pellets entering the rotary kiln will lose the reductant, carbon thermal reduction reaction of the phosphorus naturally cannot be performed, and the process fails as a result. If only the bentonite is added as a bonding agent of the pellets to perform drying and dehydration at a temperature less than 300° C., an anti-pressure strength of the pellets is only about 10 KN per ball, with a falling strength ≤1 time per meter; since an acting mechanism of the bentonite is mainly to use interlayer water in its substance structure to adjust a moisture content release speed during the drying of the pellets and improve a burst temperature of the pellets during the drying, and bentonite itself does not play a remarkable role in improving the strength of the pellets. After such pellets are fed into the rotary kiln and before the rotary kiln temperature value reaches 900° C., since the pellets entering the kiln cannot bear the mechanical frictional force resulting from movement of material balls in the pellets, a lot of said pellets are pulverized, and thereafter the phosphate ore powder, silica powder and carbonaceous reductant forming the pellets will separate, the phosphate ore powder after pulverization causes failure of reduction of phosphorus as it cannot get in close contact with carbonaceous reductant. More seriously, once the phosphate ore powder separates from silica powder, its melting point abruptly falls below 1250° C. When such powder-like phosphate ore passes through a high-temperature reducing area (with a material layer temperature of 1300° C. or so) of the rotary kiln, it will totally changes from solid phase into a liquid phase, and thereby adheres to a liner of the rotary kiln to form high-temperature ringing of the rotary kiln, which hinders normal rotation of the materials in the rotary kiln so that a majority of materials added into the rotary kiln overflows from the rotary kiln from a feeding end of the rotary kiln, high-temperature reduction of phosphorus cannot be achieved and the process fails. It can be seen that the raw materials entering the kiln have their intrinsic drawbacks, any industrialized, large-scale or commercialized application of the above-mentioned KPA technology has not yet been witnessed so far.

2. Regarding the KPA process with the phosphate ore pellets with carbon being added, a solid material area below a material layer in the rotary kiln belongs to a reduction zone, and a gas flow area of the rotary kiln is above the material layer and belongs to an oxidization zone, the feed pellets are added from a kiln tail of the rotary kiln and discharged out of a kiln head of the rotary kiln by virtue of its own gravity and a frictional force resulting from rotation of the rotary kiln, a burner for burning fuel in the rotary kiln is mounted at the kiln head of the rotary kiln, fume resulting from the burning is introduced out by a blower at the kiln tail, a micro negative pressure is maintained in the rotary kiln, and the gas flow is opposite to a movement direction of the materials. Since there is not a mechanical isolation area between the reduction zone (solid material layer area) and the oxidization zone (the gas flow area above the solid material layer area of the rotary kiln) of the rotary kiln, the material balls exposed on the surface of the solid material layer area and $O_2$, $CO_2$ in the gas flow in the oxidization zone are subjected to convective mass transfer; on the one hand, this causes the reductant in the material balls to be partially oxidized before the material balls are heated by the gas flow heat transfer to the carbon reduction temperature of the phosphate ore so that the material balls are not sufficiently reduced due to shortage of carbonaceous reductant in the reduction zone of the rotary kiln; more seriously, the material balls exposed to the surface of the material layer at the high-temperature area of the rotary kiln is further subjected to chemical reaction with $P_2O_5$ already generated from reduction in the kiln gas to produce calcium metaphosphate, calcium phosphate and other metaphosphates or phosphates, thereby causing the phosphorus already reduced into the gas phase to return to the material balls again and form a layer of white crust rich in $P_2O_5$ on the surface of the material balls, the layer of crust generally having a thickness of 300 μm-1000 μm, the content of $P_2O_5$ in the layer of crust topping 30%; as a result, $P_2O_5$ transferred from the material balls to the gas phase does not exceed 60%, which cause a lower yield ratio of $P_2O_5$ in the phosphate ore and thereby causes waste of mineral resources and large rise of the phosphoric acid production cost so that the above KPA process losses value in respect of commercial application and industrial spread. Researchers desire gas volatized from the material layer to isolate the reduction zone from the oxidization zone in the rotary kiln, but industrial experiments performed in a rotary kiln with an inner diameter 2 m show that the phenomena of white crust rich in $P_2O_5$ on the surface of the pellets still cannot be avoided.

Due to the above-mentioned technical drawbacks, it is still very difficult to use the KPA process proposed by ORC Corporation in large-scale industrial application and practice to produce phosphoric acid.

Joseph A. Megy proposes some improved technical methods with respect to the KPA process (see US patent document U.S. Pat. No. 7,910,080B), i.e., on the premise of maintaining the basis process of KPA unchanged, providing a material stopping ring on a kiln head material discharging end of the cylinder of the rotary kiln to improve a solid material filling rate of the rotary kiln, and meanwhile increasing the diameter of the rotary kiln to reduce a surface area to volume ratio of an inner material layer of the rotary kiln, reduce probability of the material of the material layer being exposed to the surface of the solid material layer to shorten the time that the reductant carbon in the material balls is oxidized by $O_2$ in the kiln gas in the rotary kiln, reduce burn of the reductant carbon before the material balls reach the reduction zone of the rotary kiln and meanwhile decease generation of phosphates or metaphosphates on the surface of the material balls in the high-temperature area of the rotary kiln. In addition, according to the process, it is desired that partial petroleum coke is added to the materials entering the rotary kiln so that reducing gas generated by a volatile matter in the petroleum coke due to heat reception and volatilization is used to cover between the material layer and the gas flow oxidization area of the rotary kiln to further block the probability of the $O_2$ and $P_2O_5$ in the gas flow in the rotary kiln reacting with the material balls to ensure normal operation of the process. However, increase of the filling rate of the rotary kiln allows the material balls to bear larger mechanical frictional force in the rotary kiln, thereby causing a larger proportion of pulverization of the material balls in the rotary kiln, and forming more substances with a melting point lower than the phosphate ore carbon thermal reduction temperature so that the high-temperature ringing of the rotary kiln becomes quicker and more serious and earlier failure of the process is caused. In addition, the volatile matter generated by added small amount of petroleum coke is not sufficient to produce sufficient gas and it is difficult to form an effective isolation layer between the solid material layer of the rotary kiln and the gas flow area in the rotary kiln. If an excessive amount is added, the materials in the rotary kiln will entrain a large amount of fuel so that in a slag ball cooling machine in the subsequent process, the redundant fuel is confronted with the air for cooling the slag balls and burns rapidly, a large amount of heat resulting from the burning not only increases the difficulty in cooling the high-temperature slag balls exiting the rotary kiln but also substantially increases the production cost of the process and makes implementation of the commercialized and large-scale application of the process impossible.

However, in the course of the subsequent study, the inventors discovered a series of new technical problems, of which there are some technical problems reflected in raw material pre-treatment stage. The raw material pre-treatment apparatus and the raw material pre-treatment process system employed in the raw material pre-treatment stage are not reasonable and scientific, and results in a relatively high process cost and energy consumption; a more outstanding technical problem is that the proportions in raw materials with a large ratio fluctuation range, and mixed raw materials are not homogeneous enough, which result in a large fluctuation of a $CaO/SiO_2$ molar rate in composite pellets, a further more serious problem of high-temperature ring formed by powder materials in rotary kiln and a further more increased risk of failure of the process.

Hence, to further decrease the production cost and energy consumption in the current KPA for application of industrialization and commercialization, and carry out a long-term production in a more stable manner, the raw material pre-treatment stage comprising the preparation and grinding of raw material needs to be modified and improved by those skilled in the art.

SUMMARY

The present invention aims to overcome drawbacks in the prior art and provides a raw material pre-treatment process system and a raw material pre-treatment method suitable for kiln phosphoric acid process with the advantages of optimized and reasonable structural, low cost, small energy consumption and ensuring of the stable operation of subsequent kiln phosphoric acid process.

To solve the above technical problem, the present invention provides a raw material pre-treatment process system suitable for kiln phosphoric acid process comprising a carbonaceous reductant pre-treatment system, a phosphate ore pre-treatment system and a silica pre-treatment system which are independent from one another, outlets of the carbonaceous reductant pre-treatment system, phosphate ore pre-treatment system and silica pre-treatment system are all connected to an inner pellet material mixing device via a first delivery device, and outlets of the carbonaceous reductant pre-treatment system and the silica pre-treatment system are both additionally connected to a shell material mixing device via a second delivery device.

The present invention also provides a raw material pre-treatment method suitable for kiln phosphoric acid process employing the raw material pre-treatment process system described above, the raw material pre-treatment method comprises the following steps: pre-treating carbonaceous reductant, phosphate ore and silica respectively with a carbonaceous reductant pre-treatment system, a phosphate ore pre-treatment system and a silica pre-treatment system, feeding the carbonaceous reductant powder, phosphate ore powder and silica powder obtained after treatment into the inner ball material mixing device for pelletizing, and feeding the carbonaceous reductant and silica obtained after treatment into the shell material mixing device for mixing.

BRIEF DESCRIPTION OF THE DRAWINGS

The FIGURE illustrates a schematic diagram of a raw material pre-treatment process flow employing the raw material pre-treatment process system according to the present invention in a specific embodiment of the present invention.

DETAILED DESCRIPTION

The embodiments of the present invention are described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be through and complete, and will fully convey the scope of the invention to those skilled in the art. Among other things, the present invention may be embodied as systems, methods or devices. The following detailed description should not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on". The term "coupled" implies that the elements may be directly connected together or may be coupled through one or more intervening elements. Further reference may be made to an embodiment where a component is implemented and multiple like or identical components are implemented.

While the embodiments make reference to certain events this is not intended to be a limitation of the embodiments of the present invention and such is equally applicable to any event where goods or services are offered to a consumer.

In an embodiment of the present invention, a raw material pre-treatment process system suitable for kiln phosphoric acid process comprising a carbonaceous reductant pre-treatment system, a phosphate ore pre-treatment system and a silica pre-treatment system which are independent from one another, outlets of the carbonaceous reductant pre-treatment system, phosphate ore pre-treatment system and silica pre-treatment system are all connected to an inner pellet material mixing device via a first delivery device, and outlets of the carbonaceous reductant pre-treatment system and the silica pre-treatment system are both additionally connected to a shell material mixing device via a second delivery device.

In an embodiment of the present invention, the carbonaceous reductant pre-treatment system mainly comprises a single-stage crushing device, a carbonaceous reductant intermediate bin, an ore grinding device, a carbonaceous reductant powder storage bin and a formulating device which are connected in turn.

In an embodiment of the present invention, the phosphate ore pre-treatment system mainly comprises a single-stage crushing device, a phosphate ore intermediate bin, an ore grinding device, a homogenization silo and a formulating device which are connected in turn.

In an embodiment of the present invention, the silica pre-treatment system mainly comprises a single-stage crushing device, a silica intermediate bin, an ore grinding device, a silica powder storage bin and a formulating device which are connected in turn or mainly comprises a dual-stage one-closed-loop crushing device, a silica intermediate bin, an ore grinding device, a silica powder storage bin and a formulating device which are connected in turn.

In an embodiment of the present invention, in the raw material pre-treatment process system, the single-stage crushing device employs a hammer-type crusher, an impact crusher, or a hammer type-impact type combined crushing.

In an embodiment of the present invention, the dual-stage one-closed-loop crushing device mainly comprises a jaw crusher, a screening machine and a cone crusher which are connected in turn, and a discharge port of the cone crusher is cyclically connected to a feed port of the screening machine.

In an embodiment of the present invention, in the raw material pre-treatment process system, the ore grinding device in the carbonaceous reductant pre-treatment system employs a vertical grinder or an air swept coal mill and is connected to the carbonaceous reductant powder storage bin via a powder material-collecting and delivering device.

In an embodiment of the present invention, in the raw material pre-treatment process system, the ore grinding device in the phosphate ore pre-treatment system employs a vertical grinder or an air swept coal mill and is connected to the homogenization silo via a powder material-collecting and delivering device.

In an embodiment of the present invention, in the raw material pre-treatment process system, the ore grinding device in the silica pre-treatment system employs a ball grinder and/or a high-pressure roller press and is connected to the silica powder storage bin via a powder material-collecting and delivering device.

In an embodiment of the present invention, in the raw material pre-treatment process system, the ore grinding device is equipped with a hot air furnace for replenishing hot air during grinding.

In an embodiment of the present invention, in the raw material pre-treatment process system, powder material-collecting and delivering device comprises a cyclone powder-collecting device, a pouch powder-collecting device and a blower which are connected in turn.

The present invention also provides a raw material pre-treatment method suitable for kiln phosphoric acid process employing the raw material pre-treatment process system described above, the raw material pre-treatment method comprises the following steps: pre-treating carbonaceous reductant, phosphate ore and silica respectively with a carbonaceous reductant pre-treatment system, a phosphate ore pre-treatment system and a silica pre-treatment system, feeding the carbonaceous reductant powder, phosphate ore powder and silica powder obtained after treatment into the inner ball material mixing device for pelletizing, and feeding the carbonaceous reductant and silica obtained after treatment into the shell material mixing device for mixing.

In an embodiment of the present invention, a process procedure of the carbonaceous reductant pre-treatment system comprises: crushing the carbonaceous reductant to below 30 mm (preferably 6 mm-30 mm) in granularity by a single-stage crushing device, and then delivering the crushed material to a carbonaceous reductant intermediate bin which delivers the crushed material to an ore grinding device via a weighing and feeding device for grinding; after the ore grinding device grinding the fed material to a granularity meeting a process requirement (generally over −100 mesh, preferably −200 mesh to −325 mesh), collecting the powder material by a combined dust collector comprised of a cyclone powder-collecting device and a pouch powder-collecting device (or collected individually by a pouch powder-collecting device) and delivering the powder material collected to the carbonaceous reductant powder storage bin; replenishing hot air constantly via a configured hot air furnace during grinding so as to remove moisture content entrained in the powder material.

In an embodiment of the present invention, a process procedure of the phosphate ore pre-treatment system comprises: crushing the phosphate ore to below 30 mm (preferably 6 mm-30 mm) in granularity by a single-stage crushing device, and then delivering the crushed material to a phosphate ore intermediate bin which delivers the crushed material to an ore grinding device via a weighing and feeding device for grinding; after the ore grinding device grinding the fed material to a granularity meeting a process requirement (generally over −100 mesh, preferably −100 mesh to −200 mesh), collecting the powder material by a combined dust collector comprised of a cyclone powder-collecting device and a pouch powder-collecting device (or collected individually by a pouch powder-collecting device) and delivering the powder material collected to a homogenization silo; replenishing hot air constantly via a configured hot air furnace during grinding so as to remove moisture content entrained in the powder material.

In an embodiment of the present invention, a process procedure of the silica pre-treatment system comprises: crushing silica to below 30 mm (preferably 6 mm-30 mm) in granularity by a single-stage crushing device or a dual-stage one-closed-loop crushing device, and then delivering the crushed material to a silica intermediate bin which delivers the crushed material to an ore grinding device via a weighing and feeding device for grinding; after the ore grinding device grinding the fed material to a granularity meeting a process requirement (generally over −100 mesh, preferably −100 mesh to −200 mesh), collecting the powder material by a combined dust collector comprised of a cyclone powder-collecting device and a pouch powder-collecting device and delivering the powder material collected to a silica powder storage bin; replenishing hot air constantly via a configured hot air furnace during grinding so as to remove moisture content entrained in the powder material.

In an embodiment of the present invention, the homogenization silo is a gap type homogenization silo or a continuous homogenization silo, the homogenization silo employs compressed air to stir the powder material in the silo uniform with a homogenization value greater than or equal to 4.

EXAMPLES

As shown in FIGURE, a raw material pre-treatment process system suitable for kiln phosphoric acid process comprises a carbonaceous reductant pre-treatment system, a phosphate ore pre-treatment system and a silica pre-treatment system which are independent from one another, outlets of the carbonaceous reductant pre-treatment system, phosphate ore pre-treatment system and silica pre-treatment system are all connected to an inner pellet material mixing device via a first delivery device, and outlets of the carbonaceous reductant pre-treatment system and the silica pre-treatment system are both additionally connected to a shell material mixing device via a second delivery device.

The present embodiment employs coal material (coke powder or petrol coke) as the carbonaceous reductant. The carbonaceous reductant pre-treatment system according to the present embodiment mainly comprises a single-stage crushing device, a coal material intermediate bin, an ore grinding device, a coal powder storage bin and a formulating device which are connected in turn; the phosphate ore pre-treatment system in the present embodiment mainly comprises a single-stage crushing device, a phosphate ore intermediate bin, an ore grinding device, a homogenization silo and a formulating device which are connected in turn; the silica pre-treatment system in the present embodiment mainly comprises a dual-stage one-closed-loop crushing device, a silica intermediate bin, an ore grinding device, a silica powder storage bin and a formulating device which are connected in turn.

In the present embodiment, each main raw material is equipped with an independent crushing device and ore grinding device, crushing individually and grinding to produce powder respectively and preparing raw materials according to a $CaO/SiO_2$ molar rate and amount of reductant set in the process may, to a large extent, ensure stability of ingredients of the raw materials and prevent larger fluctuation of the proportions of raw materials, thus the melting point of the composite pellets produced is stayed the same which solve a technical problem of ring formed in the rotary kiln by the composite pellets because of fluctuation of the proportions in raw materials.

In the present embodiment, the single-stage crushing device used in the carbonaceous reductant pre-treatment system and the phosphate ore pre-treatment system is a hammer-type crusher, the dual-stage one-closed-loop crushing device employed in the silica pre-treatment system mainly comprises a jaw crusher, a screening machine and a cone crusher which are connected in turn, a discharge port of the cone crusher is cyclically connected to a feed port of the screening machine.

The raw material pre-treatment in the present embodiment employs an optimized and improved crushing device with a high crushing ratio, which can not only substantially reduce the energy consumption in crushing procedure but also decrease the investment for the crushing device and process cost; considering the properties of silica, i.e., hardness of silica, the crushing of silica in the present invention preferably employs a single-stage impact crushing with a high intensity or a dual-stage one-closed-loop crushing comprised of a jaw crusher, a screening machine and a cone crusher which are connected in turn which also effectively improves the crushing efficiency of silica.

In the present embodiment, the ore grinding device in both of the carbonaceous reductant pre-treatment system and the phosphate ore pre-treatment system employs a vertical grinder, the ore grinding device in the silica pre-treatment system employs a ball grinder and/or a roller press, and the respective ore grinding devices are respectively connected to the coal powder storage bin, the homogenization silo and the silica powder storage bin via respective a powder material collecting and delivering device. Each ore grinding device is equipped with a hot air furnace for replenishing hot air during grinding.

In the present embodiment, each powder material collecting and delivering device comprises a cyclone powder-collecting device, a pouch powder-collecting device and a blower which are connected in turn, and an air outlet of each blower is connected to the hot air furnace corresponding to the respective pre-treatment systems or directly discharged outside.

In the preferred embodiment, homogenization of phosphate ore powder employs a gas-flow homogenization method which further ensures the stability of chemical components in the phosphate ore and makes industrialized stable production to be possible.

In the preferred embodiment, a hot air furnace is equipped for the ore grinding device to omit a step of drying various ores and raw materials, further to simplify the process procedure and meanwhile reduce the ore grinding energy consumption by over 20% As shown in FIGURE, a raw material pre-treatment method suitable for kiln phosphoric acid process employing the raw material pre-treatment process system according to the present embodiment comprises the following steps: pre-treating the coal powder, phosphate ore and silica respectively with a carbonaceous reductant pre-treatment system, a phosphate ore pre-treatment system and a silica pre-treatment system, feeding the carbonaceous reductant powder, phosphate ore powder and silica powder obtained after treatment into the inner ball material mixing device for pelletizing, and feeding the carbonaceous reductant and silica obtained after treatment into the shell material mixing device for mixing; the raw material pre-treatment method specifically comprises the following steps:

1. Coal material treatment: −200 mm coal material (coke powder or petrol coke) is crushed to less than 12 mm in granularity by single-stage hammer-type crushing (or impact crushing or hammer type-impact type combined crushing), and then the crushed material is delivered to the coal material intermediate bin which delivers the crushed material to a vertical roller mill (namely, a vertical grinder, or an air-swept coal mill may be used) via a weighing and feeding device for grinding, and the weighing and feeding device may stabilize a load of the grinder; after the vertical grinder grinds feed powder to −100 mesh to −325 mesh, the powder material is collected by a combined dust collector comprised of a cyclone powder-collecting device and a pouch powder-collecting device (or collected individually by a high-concentration pouch dust collector) and delivered to the coal powder storage bin; hot air is replenished constantly via the configured hot air furnace during grinding so as to remove moisture content entrained in the powder material according to the moisture content of the raw material; the whole coal material pre-treatment procedure has a higher crushing ratio, and can save the crushing energy consumption and lower investment and the process cost.

2. Phosphate ore pre-treatment: −200 mm phosphate ore is crushed to less than 12 mm in granularity by single-stage hammer-type crushing (or impact crushing or hammer type-impact type combined crushing), and then the crushed material is delivered to the phosphate ore intermediate bin which delivers the crushed material to a vertical grinder (an air-swept coal mill) via a weighing and feeding device for grinding, and the weighing and feeding device may stabilize a load of the grinder; after the vertical grinder grinds feed powder to −100 mesh to −200 mesh, the powder material is collected by a combined dust collector comprised of a cyclone powder-collecting device and a pouch powder-collecting device (or collected individually by a high-concentration pouch dust collector) and delivered to the homogenization silo; hot air is replenished constantly via the configured hot air furnace during grinding so as to remove moisture content entrained in the powder material according to the moisture content of the raw material; the whole phosphate ore pre-treatment procedure has a higher crushing ratio, and can save the crushing energy consumption and lower investment.

3. Silica pre-treatment: −200 mm silica is crushed to less than 12 mm in granularity by a dual-stage one-closed-loop crushing device (or single-stage impact type crushing or hammer type-impact type combined crushing), and then the crushed material is delivered to the silica intermediate bin which delivers the crushed material to a high-pressure roller press (or a high-pressure roller press-ball grinding combined manner) via a weighing and feeding device for grinding, and the weighing and feeding device may stabilize a load of the grinder; after the ore grinding device grinds feed powder to −100 mesh to −200 mesh, the powder material is collected by a combined dust collector comprised of a cyclone powder-collecting device and a pouch powder-collecting device and delivered to the silica powder storage bin; hot air is replenished constantly via the configured hot air furnace during grinding so as to remove moisture content entrained in the powder material according to the moisture content of the raw material.

4. The coal powder delivered by a delivery device into the coal powder storage bin meanwhile serves as a raw material for the inner ball material and the shell material in the subsequent kiln phosphoric acid process; the silica powder delivered by a delivery device into the silica powder storage bin meanwhile serves as a raw material for the inner ball material and the shell material in the subsequent kiln phosphoric acid process; the phosphate ore powder delivered by a delivery device into the homogenization silo is stirred and homogenized by using compressed air. A gap type homogenization silo may be used, or a continuous homogenization silo may be used, with a homogenization value greater than 4; the homogenization silo itself is used as the storage bin of phosphate ore powder.

The pre-treatment for the raw material in KPA is completed by employing the raw material pre-treatment process system and process method described above.

The invention claimed is:

1. A raw material pre-treatment process system for kiln phosphoric acid process, comprising a carbonaceous reductant pre-treatment system, a phosphate ore pre-treatment system and a silica pre-treatment system which are independent from one another, a first outlet of the carbonaceous reductant pre-treatment system, a first outlet of the phosphate ore pre-treatment system and a first outlet of the silica pre-treatment system are all connected to a core pellet material mixer via a first delivery device, and a second outlet of the carbonaceous reductant pre-treatment system and a second outlet of the silica pre-treatment system are both connected to a shell material mixer via a second delivery device which is independent from the first delivery device, the carbonaceous reductant pre-treatment system, where a carbonaceous reductant is pretreated, comprises a first single-stage crushing device, a carbonaceous reductant intermediate bin, a first ore grinding device, a carbonaceous reductant powder storage bin and a first formulating device, which are connected in sequence, the phosphate ore pre-treatment system, where a phosphate ore is pretreated, comprises a second single-stage crushing device, a phosphate ore intermediate bin, a second ore grinding device, a homogenization silo and a second formulating device, which are connected in sequence, the silica pre-treatment system, where silica is pretreated, comprises a third single-stage crushing device, a silica intermediate bin, a third ore grinding device, a silica powder storage bin and a third formulating device, which are connected in sequence, or comprises a dual-stage one-closed-loop crushing device, the silica intermediate bin, the third ore grinding device, the silica powder storage bin and the third formulating device, which are connected in sequence, the first, second and third single-stage crushing devices each comprise one or a combination of a hammer crusher and an impact crusher, the dual-stage one-closed-loop crushing device comprises a jaw crusher, a screening machine and a cone crusher which are connected in sequence, and a discharge port of the cone crusher is connected to a feed port of the screening machine to form a recirculation loop, the first ore grinding device in the carbonaceous reductant pre-treatment system comprises a vertical grinder or an air swept mill and is connected to the carbonaceous reductant powder storage bin via a first powder material-collecting and delivering device, the second ore grinding device in the phosphate ore pre-treatment system comprises a vertical grinder or an air swept coal mill and is connected to the homogenization silo via a second powder material-collecting and delivering device, the third ore grinding device in the silica pre-treatment system comprises a ball grinder and/or a high-pressure roller press and is connected to the silica powder storage bin via a third powder material-collecting and delivering device, the first, second and third powder material-collecting and delivering devices each comprise a cyclone powder-collector, a pouch powder-collector and a blower which are connected in sequence.

2. The process system according to claim 1, wherein the first ore grinding device in the carbonaceous reductant pre-treatment system is equipped with an air furnace for replenishing air during grinding.

3. The process system according to claim 1, wherein the second ore grinding device in the phosphate ore pre-treatment system is equipped with an air furnace for replenishing air during grinding.

4. The process system according to claim 1, wherein the third ore grinding device in the silica pre-treatment system is equipped with an air furnace for replenishing air during grinding.

* * * * *